United States Patent [19]

Kopelman et al.

[11] Patent Number: 5,264,698
[45] Date of Patent: Nov. 23, 1993

[54] NANOMETER DIMENSION OPTICAL DEVICE WITH MICROIMAGING AND NANOILLUMINATION CAPABILITIES

[76] Inventors: Raoul Kopelman, 1065 Heatherway, Ann Arbor, Mich. 48104; Aaron Lewis, 38 Woodcrest Ave., Ithaca, N.Y. 14850

[21] Appl. No.: 899,694

[22] Filed: Jun. 17, 1992

Related U.S. Application Data

[62] Division of Ser. No. 380,099, Jul. 14, 1989, Pat. No. 5,148,307.

[51] Int. Cl.⁵ .............................................. G01N 23/22
[52] U.S. Cl. ..................................... 250/307; 250/306
[58] Field of Search ......................... 250/307, 526, 306

[56] References Cited

U.S. PATENT DOCUMENTS

| | | | |
|---|---|---|---|
| 4,604,520 | 8/1986 | Pohl | 250/216 |
| 4,659,429 | 4/1987 | Isaacson et al. | 156/644 |
| 4,725,727 | 2/1988 | Harder et al. | 250/227.29 |
| 4,917,462 | 4/1990 | Lewis et al. | 250/216 |
| 4,947,034 | 8/1990 | Wickramasinghe | 250/216 |

OTHER PUBLICATIONS

"Optical characteristics of 0.1 $\mu$ m circular apertures in a Metal Film as Light Sources for Scanning Ultramicroscopy" Fischer; J. Vac. Sci. Technol. B3(1), Jan.-/Feb. 1985.

"Super-resolution Fluorescence Near-Field Scanning Optical Microscopy" Harootunian et al: Appl. Phys. Lett. 49 (11), Sep. 15, 1986.

"Development of A 500 Å Spatial Resolution Light Microscope" Ultramicroscopy 13 (1984) 227-232.

"Optical Stethoscopy: Image Recording with Resolution $\lambda/20$" Pohl, Denk and Lanz: IBM Zurich Research Laboratory, Rüschlikon, Switzerland; Appl. Phys. Lett 44 (7) Apr. 1984.

*Primary Examiner*—Jack I. Berman
*Attorney, Agent, or Firm*—Jones, Tullar & Cooper

[57] ABSTRACT

A nanometer dimension light source includes a source of excitation and an active, electrooptic or chemilluminescent material such as crystalline anthracene. The material is introduced into a confined space having molecular dimensions or is shaped to a point of molecular dimensions. The material is surrounded by an insulator such as a glass pipette which also forms the confined space and which also serves as a reflector for radiation produced in the material. An electric field is imposed on the active medium, injecting holes and electrons which recombine to produce light within the small dimensions of the pipette.

20 Claims, 1 Drawing Sheet

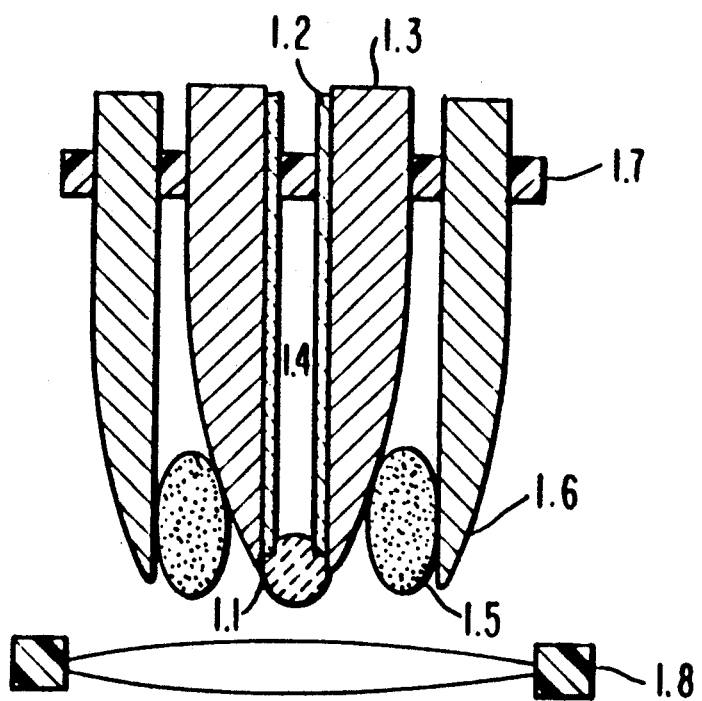

NANOMETER DIMENSION OPTICAL DEVICE WITH MICROIMAGING AND NANOILLUMINATION CAPABILITIES

This is a divisional of copending application Ser. No. 07/380,099, filed Jul 14, 1989, now U.S. Pat. No. 5,148,307, issued Sept. 15, 1992.

1. Field of the Invention

The invention is a device that results in a nanometer dimension coherent or incoherent light source, a radiation detector, switch and/or a modulator and provides for microimaging and other applications that involve super-resolution illumination of materials. For the nanometer optical device in this instrument a variety of materials can be used and a choice of excitation methods is available. The excitation methods can either be electrical, magnetic, optical or chemical and these excitation methods allow for the production, detection and control of the radiation in the instrument offer a wide range of frequencies, wavelengths and intensity domains. The instrument holds the optical device rigidly and stably with the capability for micromovement scanning resulting in super-resolution microimaging and/or illumination of materials.

2. Background of the Invention

When light is focused by a lens it is limited in its dimension to approximately half the wavelength and thus even visible laser beams cannot be focused down to dimensions smaller than approximately 200 nm. Certainly the dimensions below 50 nm which are normally attainable with electron beams cannot be obtained by any light sources that are presently available. This includes even light sources that exist in the far ultraviolet such as the ArF excimer laser which emits light at 193 nm. In fact there are additional problems in the focusing of such far uv sources and these include non-gaussian shapes, lens quality etc. The present invention includes a device that permits the encapsulation of light in atoms of molecules as excitons which allows light to propagate in molecular dimensions, using either electrical, optical or chemical excitation. This allows production of freely scannable light sources with dimensionalities that have never before been achieved as well as ultrasmall radiation detectors, optical switches and modulators. Our instrument also includes the ability to scan this device over a sample and to detect and image the radiation or excitons as they are transmitted, reflected, quenched or as the radiation excites luminescence or produces non-linear optical effects in the sample. Included in this is the ability of the present light source to store light energy as an exciton which can then be transmitted with high efficiency to the desired location either illuminating this location or imaging it.

3. State of Prior Art

3.1 Nanometer Light Sources

Nanometer light sources have not been reported. However, in the past a solution that overcame some of the problems mentioned in section 2 was to aperture a larger source using a variety of methods [A. Lewis et al., Ultramicroscopy 13, 227 (1984); D. Pohl et al., Appl. Phys. Lett. 44, 652 (1984); U. Ch. Fisher, J. Vac. Sci. Technol. B. 3 1498 (1985); A. Harootunian et al., Appl. Phys. Lett. 49, 674 (1986); A. Lewis and M. I. Isaacson, U.S. Pat. No. 4,659,429; and A. Lewis, M. I. Isaacson, E. Betzig and A. Harootunian, U.S. Patent Pending]. The most successful of these methods was the use of a micropipette with which a large light source was apertured to produce a spot of light on the dimension of $\simeq 100$ nm. A serious problem with this method is the difficulty to propagate light through tubes with dimensions smaller than the wavelength. Thus, in applying such a method to create a small spot of light it was imperative to produce pipettes with dimensions that were large over most of the region of light propagation and then were rapidly tapered to produce the small aperture required. Even the small region of taper where the dimension of the tube is below the wavelength causes a severe reduction in the intensity of the original source which is being apertured. In fact there is an exponential decrease in the intensity of the light in this evanescent region of the pipette which is below the cut-off. In all such lensless methods that have thus far been used to produce subwavelength light spots the principal approach has been to transmit light produced by a large light source through an aperture in a metallic environment. This has the additional problem that the minimum dimension that can be achieved is dependent on the transmission of the aperture relative to that of the surrounding metal. This puts an approximate limit on the dimensionality of such spots of light that is about 50 nm. Our method overcomes all of these fundamental difficulties that are inherent in the methodologies that have been employed in attempts to obtain subwavelength spots of light on the dimensions normally associated with electron and ion beams. This results from the efficient transport of excitons in regions of molecular size.

3.2 Nanometer Radiation Detectors, Switches and Modulators

There has been no report of such devices that can transport light in physical dimensions of molecular size.

3.3 Optical Nanoscopes

An instrument with the ability to resolve with light dimensions below 50 nm does not exist at the present time.

3.4 Exciton Microscope

An instrument with the ability to scan an exciton source over a sample has never been reported.

4. Summary of the Invention

A device and a method for nanometer optics, which can produce, detect, switch and/or modulate coherent and incoherent radiation, while scanning it or keeping it stationary over a surface. The device uses an excitation source and a material to produce or detect light. The material may be in contact with two electrodes separated by an electrically insulating substance. This combination of electrodes, insulating and light producing/detecting materials can, depending on the application, be used as a stand alone device or can be surrounded by an additional detecting/light producing material with the whole combination surrounded by an additional electrode. The additional coatings give the device added flexibility for certain applications. Alternatively if the primary excitation of the material is by a conventional light source such a source (for example a laser) will have to be included in the instrument.

The nanometer optical device is incorporated in a system with the ability to scan materials close to a surface with ultra high resolution. Appropriate feedback techniques (such as force, tunneling and exciton transfer) are required to accomplish this. The effects of this scanning of such light sources over materials can be detected in the instrument as a change in transmission, exciton transfer or non-linear optical phenomena induced in the material. As a result of the detection of one or more of the above optical phenomena three dimensional images can be created of the sample if the instrument is coupled to an appropriate computer system. Alternatively the fine resolution illumination capabilities of the instrument will allow the high resolution excitation of materials producing effects such as high resolution alterations in the absorption of materials and the alteration and/or removal of material from various samples such as biological cells, organelles or molecules and photoresists.

5. Description of the Invention 5.1 Energy Confinement

In order to understand the essence of our invention it is essential to appreciate that our fundamental understanding of energy propagation in materials [M. Pope and C. E. Swenberg, *Electronic Processes in Organic Crystals* (Oxford University Press, New York, 1982); A. H. Francis and R. Kopelman in *Topics in Applied Physics, Vol. 49; Laser Spectroscopy of Solids,* 2nd ed. edited by W. M. Yen and P. M. Selzer, Springer-Verlag, Berlin (1986) p. 241] indicates the possibility that energy can be confined in molecular and atomic dimensions. Recently, detailed experiments have verified these fundamental concepts [J. Prasad and R. Kopelman, Phys. Rev. Lett. 59, 2103 (1987)] and this allows us to conceive of devices which can use the stored energy to produce electrooptical devices with molecular dimensions. What is needed is to be able to confine effectively the materials that can store the electrical, optical or chemical excitation that will eventually be used for these devices. Thus the essence of our invention is a method and a device to confine selected energy carrying materials that can be appropriately excited and modulated. Previously the closest technology was the production of 100 nm light spots discussed in section 3.1 and even this technology never produced an ultrasmall light source but rather apertured larger light sources.

The ability of appropriate materials to carry energy in small dimensions is not enough for producing a device with nanometer dimensions. What is needed is a method to confine in three dimensions the material and the energy with minimum loss in the energy before it is detected or produces photons. Thus the problem is broken into two parts. First there has to be a method of confinement and then there has to be a method in order to insert appropriate energy propagating materials into these dimensions. Our device resolves both these problems. Specifically we surround the energy carrying material with a dielectric and a conductor (see FIG. 1). Thus the material and the energy are confined close to an aperture or an electrode and the material either emits the energy through the aperture or detects and/or modulates the energy via the electrodes.

In addition to the above, in order for the nanometer optical device to be useful in these dimensionalities it has to be included within a structure that allows it to be scanned near the surface of materials. This involves two things. First, the device must be such that the active medium is at the tip of a structure that will permit easy alignment relative to a surface. Second, it has to be in a holder that is stable and has the ability for nanometer movements in the x, y and z directions. Our invention accomplishes all of these objectives with the additional feature of having standard computer and other interfaces to allow for the detection of the effects of this light source on materials and the display of these effects to produce three dimensional images. Finally, the instrumentation described in this invention also permits surface modification of biological or technological samples with a resolution of $\leq 50$ nm.

5.2 Brief Description of the Drawings

The foregoing, and additional objects, features and advantages of the present invention will be understood by those skilled in the art from the following detailed descripton of a preferred embodiment, taken in conjunction with the accompanying drawing, in which FIG. 1 is a cross-sectional view of a preferred form of the optical device of the invention.

5.3 Description of Preferred Embodiment

A device according to the present invention is shown in FIG. 1. It consists of the following parts:

1. An energetically active, electrooptic or chemiluminescent material 1.1, such as crystalline anthracene, poly-vinylnaphthalene or other organic or inorganic, electrooptical or chemiluminescent materials that can be precipitated from solvents, deposited or otherwise introduced into the confined space shown in FIG. 1 or can be etched to a point of molecular dimensions.

2. A material 1.2 that surrounds the active medium. For electrooptic excitation this material is an insulator that can be either deposited around the active medium 1.1 or can be a glass pipette in which the material 1.2 can be deposited from solution inserted into the tip of the pipette by capillary action. Such pipettes can be pulled to 20 nm outer diameters and with considerably smaller inner diameters. This material also acts for confinement of material 1.1 and/or as an effective insulator for the energy propagating in material 1.1 and/or as a reflector for radiation produced in material 1.1.

3. A material 1.3 that coats material 1.2 and the tip of the active material 1.1. This material 1.3 has to be conductive and opaque for electrooptical or magnetooptical devices and has to be simply opaque for chemiluminescent or optically excited devices. For the production of coherent light the tip of material 1.2 should be coated in a manner that partially transmits the light in order to generate with material 1.4 discussed below a lasing cavity.

4. A fourth material 1.4 that is in good contact with the active medium 1.1. This material 1.4 has to be a solid or liquid conductor for electrooptical devices, a light propagating material for optical excitation or an appropriate chemical solution for chemical or biochemical excitation. For the production of coherent light this material should also be reflecting.

5. An energetically active, electrooptic or chemiluminescent material 1.5 that is in contact with the conductive material 1.3. For certain applications this material can be eliminated.

6. A material 1.6 that coats material 1.5 and the tip of the active material 1.1. This material 1.6 has to be conductive and opaque for electrooptical or magnetooptical devices and has to be simply opaque for chemiluminescent or optically excited devices. This material 1.6 can also be eliminated for the applications where material 1.5 is not used.

7. The device labelled 1.1–1.6 is contained within a holder 1.7 that can be oriented either vertically or horizontally. The holder could have micromovement capabilities or alternately all of the micromovement could be a part of a sample stage 1.8. Alternatively, the micromovement cold be divided such that the fine positioning (on the 0.01 nm scale) is in the optical device holder and the rough movement is in the sample stage. The reverse is also possible.

If the device is to be operated as a light source in the electrooptical mode a d.c. or high frequency electric field is imposed on the active medium, material 1.1, or active medium, material 1.6, with the electrodes injecting electrons and holes. These electrons and holes recombine to produce light. The electrons and holes readily propagate in these small dimensions creating excitons which can also propagate in molecular dimensions and subsequently produce light which is created in this method near the aperture. The same electrooptic device can be used to detect the presence of radiation. In this mode the light interacts through the aperture with the active medium material 1.1 or 1.5 and produces electron-hole pairs which are detected by the electrodes. For switching and/or modulation, the electromagnetic field will modulate the eleotrooptical and/or magnetooptioal characteristics of the active medium which can be material 1.1 or 1.5. In addition to such electrical excitation one of the active media can also be excited by light. This produces excitons which then propagate and emit light that is confined by the opaque materials surrounding these active media. Then the light is transmitted through the aperture around material 1.1 or 1.5 which is in close proximity. Furthermore, in such a light excitation mode the device can also be used as a detector where photons enter the aperture and excite the active medium producing luminescence that propagates through materials 1.4 and then is appropriately detected with the aid of filters and/or other optical devices. Alternatively active medium 1.1 can be a luminescent bacterium, cell, virus or molecules that can be chemically activated. The emitted radiation is again confined by the opaque coating and effuses through the aperture. For the production of coherent radiation with this device material 1.3 can coat even the aperture so long as it allows for the partial transmission of the luminescent radiation. In such a coherent mode of operation material 1.3 and 1.4 also have to have the ability to produce an optical laser cavity. Finally, for the optical excitation of certain media and for the coherent and incoherent production of light with these media the combination of materials 12 and 1.3 have to be chosen to allow for the transmission of the exciting light and the confinement of the luminescence from the active medium. In this mode of optical excitation materials 1.5 and 1.6 can be eliminated.

It is of course obvious from the above that in the operation of the device either material 1.1 or material 1.5 can be used as the light source and/or the detector. Thus material 1.1 can be a light source and material 1.5 can be a detector or material 1.5 can be a light source and material 1.1 can be a detector. Alternatively, material 1.5 and 1.6 can be eliminated and material 1.1 can be a light source or material 1.1 can be a detector or material 1.1 can be a light source and a detector.

The holder for this nanometer optical device and the surrounding structure which includes the sample stage allows for x, y and z motion of the device and/or sample relative to one another and this allows for selective illumination of nanometer areas. The effects of this illumination can either be detected by one of the compartments of the optical device and/or an additional standard detector can be introduced in 1.9. The whole instrument is controlled by computer 1.10 and this includes sensing the electrooptical affects described above that permit accurate positioning of a pipette above a surface. The computer also performs imaging tasks with the effects sensed by the detector/detectors.

5.4 Applications of the Device

Such optical devices with molecular dimensions appropriately controlled have a variety of uses in near-field applications such as near-field imaging and near-field lithography where the light beam is not given the chance to spread before it reaches either the substrate or the molecular detector that we have created. In addition the system allows a whole new form of imaging that we call molecular exciton microscopy where the transfer of excitons between a surface and a tip which is either an exciton acceptor or donor can be monitored to develop exquisitely sensitive atomic or molecular resolution images of surfaces. The resolution is achieved by the nature of the exciton transfer between a surface and a rough tip that is precisely controlled relative to a surface and the sensitivity is obtained by the fact that the probability of exciton transfer can be nine orders of magnitude higher than excitation by freely propagating photons. Furthermore, systems can be envisioned that integrate two or more of these devices that can act as light sources, switches, modulators and detectors with densities that have never been achieved. Finally, even in far-field applications the availability of light sources, detectors, switches and modulators with such nanodimensions would be important additions to the arsenal of devices available in optics and electrooptics.

6. Advances Over Prior Art

With each factor of 10 improvement in dimension there have been numerous advantages that have ensued for practical applications in optics and electronics. In this optical and electrooptical area there simply are no such nanodimension devices and therefore we can expect numerous applications.

7. Experiments

We have demonstrated that materials can be deposited in such confined dimensions and energy propagation in confined areas has also been demonstrated to 10 nm for a number of active media.

We claim:

1. A method for producing radiation in nanometer dimensions comprising:
    locating an active material capable of emitting light in the tip of an electrically nonconductive pipette, wherein the tip has an internal diameter of less than about 20 nm and has an exit aperture;
    coating said pipette with an opaque material;
    exciting said active material to emit light;
    confining the emitted light to a dimension of less than about 20 nm diameter; and
    directing said light through the exit aperture toward the surface of a sample material adjacent said pipette tip to cause light to be transferred between the active material and the sample surface.

2. The method of claim 1, further including surrounding said pipette and coating with a second active material; and
    covering said second active material with a second opaque material.

3. The method of claim 2, wherein the step of exciting said active material comprises selectively exciting said first-named active material or said second active material.

4. The method of claim 3, wherein the step of exciting said active material comprises selectively applying an electric field across one of said first-named active material or said second active material; and detecting the transfer of molecular excitons and/or light between the selected active material and said sample material by the other active material.

5. The method of claim 3, wherein the step of exciting said active material comprises selectively applying a magnetic field across one of said first-named active material or said second active material; and detecting the transfer of molecular excitons and/or light between the selected active material and said sample material by the other active material.

6. A method of molecular exciton microscopy in nanometer dimensions, comprising:

confining an active material capable of operating as an exciton acceptor or donor in the tip of an electrically nonconductive pipette, wherein the tip has an internal diameter of less than about 20 nm;

coating said pipette with an opaque material;

positioning said tip within the near field of a surface to be imaged;

producing relative scanning motion between said tip and said surface; and monitoring the transfer of excitons between the active material and the surface to obtain molecular resolution microscopy.

7. A method for near field imaging by radiation of nanometer dimensions, comprising:

confining in three dimensions within a tip an energy-propagating material near a tip aperture having a diameter of less than about 20 nm;

surrounding the material with a dielectric material;

surrounding the dielectric material with an electrically conductive material to form an electrode means;

producing relative scanning of the tip aperture with respect to a surface to be imaged within the near field of the aperture; and activating the material to produce an image of the surface.

8. The method of claim 7, wherein the step of activating the material comprises imposing an electric field on said material by means of said electrode to produce electrons and holes which propagate in said material to create excitons, the excitons producing light near the aperture for imaging the surface.

9. The method of claim 7, wherein the step of activating the material comprises producing light radiation at said surface and directing such radiation to said aperture to interact with said material to produce electron-hole pairs in said material, and wherein the material further includes detecting said electron-hole pairs by said electrode means.

10. The method of claim 7, wherein the step of activating the material comprises imposing an electromagnetic field on said material.

11. The method of claim 10, further including modulating said electromagnetic field.

12. The method of claim 7, wherein the step of activating the material comprises directing light onto said material to produce excitons which propagate in said material and emit light through said aperture for imaging the surface.

13. The method of claim 7, wherein the step of activating the material comprises:

producing light photons at said surface;

directing said photons through said aperture to excite said material and to thereby produce luminescence therein;

the method further including detecting said luminescence.

14. The method of claim 7, wherein the step of activating the material comprises chemically activating luminescent molecules in said material to emit radiation from the material.

15. The method of claim 7, further including confining a second active material in a region adjacent said electrically conductive material.

16. The method of claim 15, further including energizing said second material to serve as a light source for illuminating said surface.

17. The method of claim 15, further including illuminating said second material with radiation from said surface to energize said second material, and detecting the energization of said second material.

18. The method of claim 7, wherein the step of activating the material includes transferring excitons between the material and the surface.

19. The method of claim 15, further including detecting the transfer of excitons to obtain sequencing of polymeric molecules such as proteins, deoxyribonucleic acid (DNA) or ribonucleic acid (RNA).

20. The method of claim 7, wherein the step of scanning includes producing a relative motion of about 0.01 nm resolution between the sample and the tip aperture to provide optical nanomodification and molecular surgery of samples by the application of radiation pressure, local heat or selective photophysics or photochemistry.

* * * * *